United States Patent
Onishi

(10) Patent No.: US 10,728,901 B2
(45) Date of Patent: Jul. 28, 2020

(54) WIRELESS TERMINAL AND COMMUNICATION CONTROL METHOD

(71) Applicant: TOYOTA JIDOSHA KABUSHIKI KAISHA, Toyota-shi, Aichi-ken (JP)

(72) Inventor: Ryokichi Onishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 15/969,120

(22) Filed: May 2, 2018

(65) Prior Publication Data

US 2018/0332591 A1    Nov. 15, 2018

(30) Foreign Application Priority Data

May 12, 2017   (JP) .................................. 2017-095648

(51) Int. Cl.
*H04W 72/04*   (2009.01)
*H04W 72/10*   (2009.01)
*H04W 28/02*   (2009.01)
*H04W 24/08*   (2009.01)
H04W 72/02     (2009.01)

(52) U.S. Cl.
CPC ....... *H04W 72/0486* (2013.01); *H04W 24/08* (2013.01); *H04W 28/0236* (2013.01); *H04W 28/0284* (2013.01); *H04W 72/10* (2013.01); H04W 72/02 (2013.01)

(58) Field of Classification Search
CPC ............. H04W 28/12; H04W 72/0486; H04W 28/0236; H04W 72/10; H04W 28/0284; H04W 24/08; H04W 72/02
See application file for complete search history.

(56) References Cited

U.S. PATENT DOCUMENTS

| 2004/0072565 | A1  | 4/2004  | Nobukiyo et al. |
|---|---|---|---|
| 2007/0014268 | A1* | 1/2007  | Kim ................. H04W 74/0816 370/338 |
| 2012/0044810 | A1* | 2/2012  | Koto ................ H04W 72/1252 370/237 |
| 2013/0308541 | A1  | 11/2013 | Mao et al. |

(Continued)

FOREIGN PATENT DOCUMENTS

| EP | 2963979 A1    | 1/2016 |
|---|---|---|
| EP | 3294023 A1    | 3/2018 |
| JP | 2008-061227 A | 3/2008 |

(Continued)

OTHER PUBLICATIONS

"Carrier-sense multiple access with collision avoidance." Wikipedia. "https://en.wikipedia.org/w/index.php?title=Carrier-sense_multiple_access_with_collision_avoidance&oldid=897702152".

*Primary Examiner* — Vinncelas Louis
(74) *Attorney, Agent, or Firm* — Oliff PLC

(57) ABSTRACT

A wireless terminal includes: an intercept mode evaluation unit configured to evaluate a congestion state of wireless resources, based on a communication state of other terminals intercepted during executing an intercept mode, which is a mode of intercepting communication by the other terminal; and a transmission mode execution unit configured to execute a transmission mode, in which the wireless terminal performs transmission and reception, without executing the intercept mode when the intercept mode evaluation unit evaluates that an off-time has set in.

8 Claims, 4 Drawing Sheets

(56) References Cited

U.S. PATENT DOCUMENTS

2016/0094358 A1   3/2016  Won et al.
2017/0332391 A1*  11/2017  Takahashi ............. H04W 28/12

FOREIGN PATENT DOCUMENTS

| JP | 2012-165107 A | 8/2012 |
| JP | 2014-506742 A | 3/2014 |
| JP | 2016-171513 A | 9/2016 |

* cited by examiner

WIRELESS TERMINAL AND COMMUNICATION CONTROL METHOD

CROSS REFERENCE TO RELATED APPLICATION

This application claims the benefit of Japanese Patent Application No. 2017-095648, filed on May 12, 2017, which is hereby incorporated by reference herein in its entirety.

BACKGROUND OF THE INVENTION

Field of the Invention

The present invention relates to a wireless terminal and a communication control method.

Description of the Related Art

The implementation of so-called interstitial communication is proposed in which applications that do not require real-time performance are transmitted and received during an off-time when there is surplus of wireless resources.

For example, techniques are known which involve performing data communication per unit time or unit amount at a period of a prescribed waiting time, determining a degree of congestion of wireless resources based on a performance result of the data communication, and determine whether to continue current data communication or suspend current data communication in accordance with the degree of congestion of the wireless resources (for example, refer to Japanese Patent Application Laid-open No. 2012-165107).

SUMMARY OF THE INVENTION

In the prior art described above, since the degree of congestion of wireless resources is determined by performing data communication at a period of a prescribed waiting time, the degree of congestion is not determined until the period arrives even when the degree of congestion of wireless resources is low. As a result, data communication is not necessarily performed even when the degree of congestion of wireless resources is low. Therefore, it is difficult to say that wireless resources during an off-time are being efficiently utilized. In addition, since data communication must actually be performed in order to determine a degree of congestion, the data communication for determining the degree of congestion ends up increasing the degree of congestion.

The present invention has been made in consideration of the problems described above and an object thereof is to efficiently utilize wireless resources during an off-time.

The present invention in its one aspect provides a wireless terminal, comprising an intercept mode evaluation unit configured to evaluate a congestion state of wireless resources, based on a communication state of other terminals intercepted during executing an intercept mode, which is a mode of intercepting communication by the other terminal; and a transmission mode execution unit configured to execute a transmission mode, in which the wireless terminal performs transmission and reception, without executing the intercept mode when the intercept mode evaluation unit evaluates that an off-time has set in.

Since data is not transmitted during execution of the intercept mode from the wireless terminal, a further increase in the degree of congestion can be suppressed when evaluating a congestion state of wireless resources. In addition, by constantly intercepting communication of other terminals in the intercept mode, since evaluation that an off-time has set in can be immediately implemented when a congested time changes to an off-time, data communication can be immediately started. Therefore, wireless resources during an off-time can be efficiently utilized.

Further, the wireless terminal may further comprise an intercept mode execution unit configured to execute the intercept mode without executing the transmission mode when evaluation is made that a congested time of wireless resources has set in based on a communication state while the transmission mode is being executed.

Even when the transmission mode is being executed, a switch to the intercept mode can be made immediately when wireless resources are congested. In other words, interstitial communication can be suspended depending on a congestion state of wireless resources. Accordingly, wasteful consumption of wireless resources can be suppressed when wireless resources are congested. Moreover, while a wireless base station may evaluate a congestion state of wireless resources when the transmission mode is being executed, evaluation may be performed as follows.

The wireless terminal may further comprise a transmission mode evaluation unit configured to evaluate a congestion state of wireless resources, based on a communication state of the wireless terminal while the transmission mode is being executed.

In this manner, the congestion state of wireless resources can be evaluated based on the communication state of the self terminal, and interstitial communication can be suspended when wireless resources are congested.

Further, the intercept mode evaluation unit may evaluate that an off-time has set in when throughput of data communication is equal to or larger than a threshold, and the threshold may be set, such that the higher a priority of data communication of the wireless terminal, the smaller the threshold.

A priority of data communication represents a degree of how quickly communication must be performed and may be considered comparable to, for example, real-time performance. When the degree of congestion of wireless resources is low, throughput increases. In other words, there is a correlation between the degree of congestion of wireless resources and throughput. Therefore, the degree of congestion of wireless resources can be evaluated based on throughput. While a fixed value may be adopted as a threshold at which evaluation is made that an off-time has set in, alternatively, efficiency of interstitial communication can be increased by varying thresholds in accordance with a priority of data communication. For example, when the priority is high, by reducing the threshold, evaluation that an off-time has set in is more likely to be made when evaluating the congestion state of wireless resources. Therefore, the higher the priority of communication, the greater the number of opportunities to perform interstitial communication. On the other hand, when the priority of communication is low, since interstitial communication need only be performed when the degree of congestion is low, a lower likelihood of evaluation that an off-time of wireless resources has set in does not become an issue.

Further, the intercept mode evaluation unit may evaluate that an off-time has set in when a ratio of the number of utilized channels to a total number of channels is equal to or lower than a utilization ratio threshold, and the utilization ratio threshold may be set, such that the higher a priority of data communication of the wireless terminal, the higher the utilization ratio threshold.

When the degree of congestion of wireless resources is low, a ratio of the number of utilized channels to the total number of channels (hereinafter, also referred to as a utilization ratio of channels) decreases. In other words, there is a correlation between the degree of congestion of wireless resources and the utilization ratio of channels. Therefore, the degree of congestion of wireless resources can be evaluated based on the utilization ratio of channels. While a fixed value may be adopted as a utilization ratio threshold at which evaluation of an off-time is made, alternatively, efficiency of interstitial communication can be increased by varying utilization ratio thresholds in accordance with a priority of data communication. For example, when the priority is high, by increasing the utilization ratio threshold, evaluation is more likely to be made that an off-time has set in when evaluating the congestion state of wireless resources. Therefore, the higher the priority of communication, the greater the number of opportunities to perform interstitial communication. On the other hand, when the priority of communication is low, since interstitial communication need only be performed when the degree of congestion is low, a lower likelihood of evaluation that an off-time of wireless resources has set in does not become an issue.

The present invention in its another aspect provides a communication control method executed by a wireless terminal, comprising: evaluating a congestion state of wireless resources, based on a communication state of other terminals intercepted during executing an intercept mode, which is a mode of intercepting communication by the other terminal; and executing a transmission mode, in which the wireless terminal performs transmission and reception, without executing the intercept mode when evaluation is made that an off-time has set in.

Further, the communication control method may further comprise executing the intercept mode without executing the transmission mode when evaluation is made that a congested time of wireless resources has set in, based on a communication state while the transmission mode is being executed.

Further, a congestion state of wireless resources may be evaluated based on a communication state of the wireless terminal while the transmission mode is being executed.

Further, when a congestion state of wireless resources is evaluated, evaluation may be made that an off-time has set in when throughput of data communication is equal to or larger than a threshold, and the threshold may be set, such that the higher a priority of data communication of the wireless terminal, the smaller the threshold.

Further, when a congestion state of wireless resources is evaluated, evaluation may be made that an off-time has set in when a ratio of the number of utilized channels to a total number of channels is equal to or lower than a utilization ratio threshold, and the utilization ratio threshold may be set, such that the higher a priority of data communication of the wireless terminal, the higher the utilization ratio threshold.

According to the present invention, wireless resources during an off-time can be efficiently utilized.

DESCRIPTION OF THE EMBODIMENTS

Modes for implementing the present invention will now be exemplarily described in detail based on embodiments with reference to the drawings. It is to be understood that dimensions, materials, shapes, relative arrangements, and the like of components described in the embodiments are not intended to limit the scope of the present invention to the embodiments unless specified to the contrary.

First Embodiment

Figure 1:
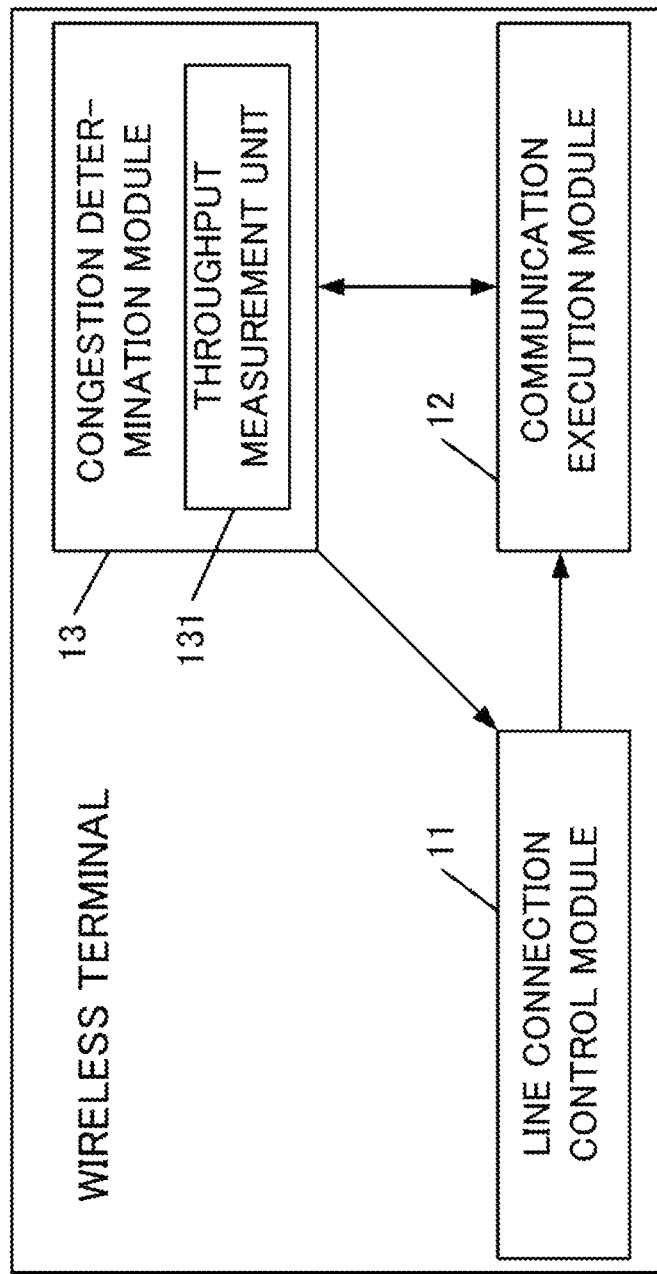
FIG. 1 is a functional block diagram showing a configuration of a main part of a wireless terminal according to a first embodiment.

FIG. 1 is a functional block diagram showing a configuration of a main part of a wireless terminal 1 according to the present embodiment. In FIG. 1, components not necessary for describing the present embodiment have been omitted. The wireless terminal 1 according to the present embodiment includes a line connection control module 11, a communication execution module 12, and a congestion determination module 13. These modules can be implemented using hardware including a field programmable gate array ("FPGA") or an application-specific integrated circuit ("ASIC"). Alternatively, these modules can be implemented using a combination of hardware such as a general-purpose processor and software. In addition, while a wireless communication system according to the present embodiment is not particularly limited, for example, cellular communication (3G, 4G, LTE, and the like), DSRC, a wireless LAN, millimeter-wave communication, and the like can be adopted.

The line connection control module 11 requests the communication execution module 12 to perform data transfer or data observation for each communication session. The communication execution module 12 executes a line connection process and a data communication process in response to the data transfer request, and notifies the congestion determination module 13 of a performance result of data transfer. In addition, the communication execution module 12 executes a line connection process and a data observation process in response to the data observation request, and notifies the congestion determination module 13 of a performance result of data observation. It should be noted that, in data observation, since throughput is measured by intercepting data communication, data is not transmitted from the wireless terminal 1. The congestion determination module 13 determines a degree of congestion of wireless resources based on the performance result of data transfer or data observation, and notifies the line connection control module 11 of a determination result. The congestion determination module 13 includes a throughput measurement unit 131, and the degree of congestion of wireless resources is determined based on the throughput during data transfer or data observation. In response to the notified degree of congestion, the line connection control module 11 continues or suspends data transfer (interstitial communication) being performed by the communication execution module 12.

According to the present embodiment, since interstitial communication is attempted for every communication session and interstitial communication is continued when wireless resources are not congested but interstitial communication is suspended when the wireless resources are congested, efficient interstitial communication which utilizes off-time slots having a surplus of wireless resources can be performed efficiently.

Figure 2:
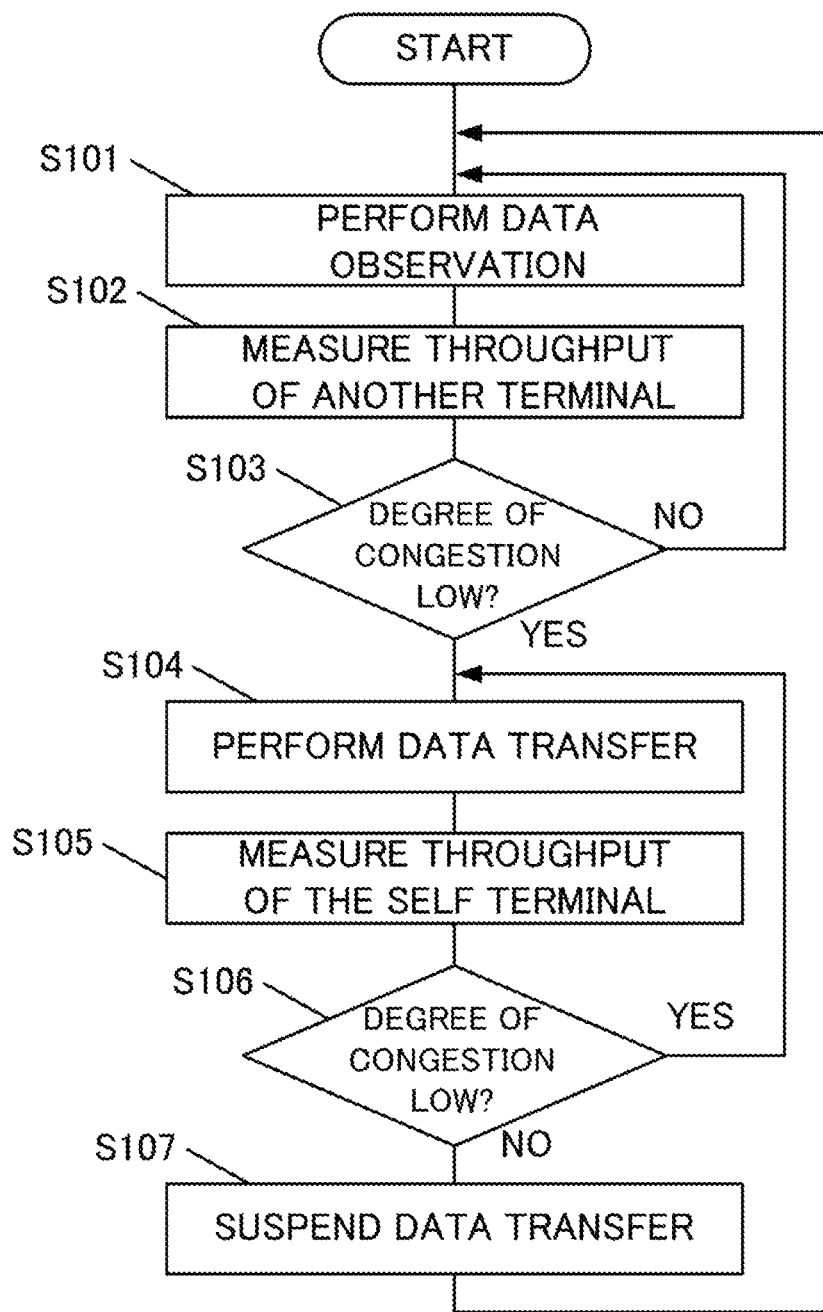
FIG. 2 is a flow chart showing operations of the first embodiment.

FIG. 2 is a flow chart showing operations of the present embodiment. In step S101, the line connection control module 11 requests the communication execution module 12 to perform data observation. In response to the data observation request, the communication execution module 12 performs data observation per unit time or unit amount of other terminals.

When data observation is completed in step S101, the flow proceeds to step S102, and a throughput TH related to the current data observation is calculated based on the following equation (1) by the throughput measurement unit 131 of the congestion determination module 13.

$$TH = \text{observed data amount/observation time} \quad (1)$$

In step S103, the congestion determination module 13 compares the throughput TH calculated in step S102 with a threshold TH1. The threshold TH1 is a lower limit value of throughput based on which evaluation of a low congestion state of wireless resources may be made. In step S103, when the throughput TH is lower than the threshold TH1 (TH<TH1), a determination that the degree of congestion of wireless resources is high is made (in other words, a determination that wireless resources are congested is made), and the flow returns to step S101. As a result, data transfer is not performed. Moreover, in the present embodiment, the intercept mode according to the present invention is executed by executing the processes of steps S101 to S103.

In contrast, when a determination is made in step S103 that the throughput TH is equal to or higher than the threshold TH1 (TH TH1), since the degree of congestion of wireless resources is determined to be low, the flow advances to step S104 and the line connection control module 11 requests the communication execution module 12 to perform data transfer. The communication execution module 12 performs data transfer in response to the data transfer request. In other words, interstitial communication is performed.

Once data transfer is performed, the flow proceeds to step S105, and a throughput TH related to the current data transfer is calculated based on equation (1) described earlier by the throughput measurement unit 131 of the congestion determination module 13.

In step S106, the congestion determination module 13 compares the throughput TH calculated in step S105 with the threshold TH1. Moreover, in the present embodiment while the threshold TH1 in step S106 is set to a same value as the threshold TH1 in step S103, the thresholds TH1 are not limited thereto and may be set to different values. While the threshold TH1 may be a fixed value set in advance, the threshold TH1 may be dynamically set as will be described later.

In step S106, when it is determined that the throughput TH is lower than the threshold TH1 (TH<TH1), a determination that the degree of congestion of wireless resources is not low is made and the flow proceeds to step S107. In step S107, the line connection control module 11 is notified of a determination result of step S106 from the congestion determination module 13, and the line connection control module 11 instructs the communication execution module 12 to suspend data communication. As a result, the current interstitial communication is suspended. Subsequently, the flow returns to step S101. Moreover, if a transfer destination is equipped with a resume function, when next performing data communication, the data communication can be started from the suspended position. While the wireless terminal 1 makes the determination in step S106 in the present embodiment, alternatively, a wireless base station may evaluate a degree of congestion and notify the wireless terminal 1 of the evaluated degree of congestion. In addition, a wireless base station may instruct the wireless terminal 1 to suspend data communication. Furthermore, while a return may be immediately made when returning to step S101 from step S107, the return may be made after waiting for a certain period of time. This wait time may be a fixed value or may vary dynamically.

In contrast, when a determination is made in step S106 that the throughput TH is equal to or higher than the threshold TH1 (TH TH1), since the degree of congestion of wireless resources is determined to be low, the flow returns to step S104 and the line connection control module 11 requests the communication execution module 12 to perform data transfer. The communication execution module 12 continues data transfer in response to the data transfer request. Accordingly, data communication is continued until transfer of unsent data is completed. Moreover, in the present embodiment, the transmission mode according to the present invention is executed by executing the processes of steps S104 to S107.

As described above, according to the present embodiment, an off-time of data communication can be sensed from a performance result of interception of wireless communication at other terminals and data communication can be started accordingly (intercept mode). In addition, after data communication is started, a congested time can be sensed from a communication performance result of wireless communication at the self terminal and data communication can be suspended accordingly (transmission mode). Therefore, since interstitial communication is suspended other than during an off-time in which throughput is high, situations can be suppressed where limited wireless resources are wastefully occupied by wireless connections with low efficiency.

In addition, in the intercept mode according to the present embodiment, since a degree of congestion of wireless resources is determined based on a communication state of other terminals without performing data transfer, wireless resources are not wastefully consumed when determining the degree of congestion. Furthermore, since a wait time until a next determination is not required as was conventional, interstitial communication can be immediately started once an off-time arrives. In other words, more communication opportunities during an off-time can be obtained. On the other hand, in the transmission mode, since data transfer is immediately suspended once the degree of congestion of wireless resources increases, wireless resources are not wastefully occupied during congestion.

Moreover, in the present embodiment, when the congestion determination module 13 evaluates a degree of congestion of wireless resources, a throughput TH is compared with a threshold TH1. While the threshold TH1 may be a fixed value set in advance, the threshold TH1 may be dynamically varied as follows. For example, the threshold TH1 may be set such that the higher a priority of performing data communication at the self terminal, the smaller the threshold TH1 so that interstitial communication is more readily performed. The priority may be replaced with a required strength or a real-time performance. For example, a priority may be set to data in advance, and the threshold TH1 may be set such that the higher the priority of data, the more readily interstitial communication is performed. An optimal relationship between a priority and the threshold TH1 can be obtained in advance. Alternatively, a priority may be determined as follows.

A priority may be set such that the larger the total amount of data to be transferred, the higher the priority since demands for reducing the time required for transfer increase. In a similar manner, a priority may be set such that the larger the remaining amount of data to be transferred, the higher the priority. In addition, a priority may be set such that the larger the amount of data having already been transmitted, the lower the priority since a certain amount of leeway is conceivably allowed. Alternatively, a priority may be set using an air time (a wireless communication time) in place of an amount of data.

In addition, a priority may be set such that the longer a transmission wait time of data, the higher the priority since demands for completing data transmission more rapidly increase. In a similar manner, a priority may be set such that the longer the retention time of data, the higher the priority. Conversely, when the retention time of data is too long, data communication may be suspended or the priority may be lowered. Furthermore, with respect to data communication when the wireless terminal 1 is moving, a travel distance while retaining data may be considered similar to data retention time and a priority may be set such that the longer the travel distance, the higher the priority. Conversely, when the travel time while retaining data is too long, data communication may be suspended or the priority may be lowered.

In addition, an expiration date may be set to data in advance, and a priority may be set such that the shorter the remaining time until the expiration date, the higher the priority since demands for completing data transmission more rapidly conceivably increase. Furthermore, data may be ranked in terms of informative value in advance, and a priority may be set such that the higher the informative value of data, the higher the priority since demands for completing data transmission more rapidly conceivably increase. Moreover, when data of other terminals intercepted when executing the intercept mode is determined to have low informative value, a priority of data of the self terminal may be raised.

In addition, a priority may be set such that the larger a transmission amount of the wireless terminal 1 or the shorter a service time in a wireless communication area of the wireless terminal 1, the higher the priority. Furthermore, a priority may be set such that the higher the travel speed of a wireless terminal, since it is estimated that communication-enabled time becomes shorter, the higher the priority since demands for completing data transmission more rapidly conceivably increase. In addition, when the wireless terminal is moving, since it is estimated that communication-enabled time becomes shorter than when the wireless terminal is stationary, a priority may be set higher. Furthermore, when a wireless terminal is moving away from a wireless base station, since it is estimated that communication-enabled time becomes shorter than when the wireless terminal is approaching the wireless base station, priority may be set higher. In this manner, a priority may be set in accordance with a travel speed or a direction of a wireless terminal. Moreover, when a service time in a wireless communication area of the wireless terminal 1 is unknown, the service time may be estimated based on travel speed.

In addition, a priority may be determined based on radio wave strength of a wireless base station or a communication distance from the wireless base station. For example, a priority may be set such that the weaker the radio wave strength of a wireless base station, since the possibility of communication being suspended is higher, the lower the priority in order to prevent wireless resources from being wastefully consumed. Furthermore, when the radio wave strength of a wireless base station is weaker than a threshold, interstitial communication need not be performed. A communication distance from a wireless base station may be estimated using, for example, information from a GPS or triangulation of the wireless base station.

In addition, a priority may be set such that the smaller a remaining amount of memory of a wireless terminal, the higher the priority, since the possibility that data must be discarded increases. Furthermore, a priority may be set such that the smaller a total amount of memory of the wireless terminal 1, the higher the priority.

The priority described above may be determined by the wireless terminal 1 itself or, alternatively, the priority may be specified by a wireless base station or a data center. In addition, while a priority may be set for each session (each content), alternatively, a priority may be set for each application, each service category, or each wireless terminal.

In addition, while a degree of congestion of wireless resources is evaluated by comparing a throughput TH with a threshold TH1 in the present embodiment, this evaluation method is not restrictive and a degree of congestion may be evaluated using other parameters. For example, a degree of congestion may be evaluated based on a utilization ratio with respect to all wireless resources. Alternatively, a degree of congestion may be evaluated using an air time (a wireless communication time).

Second Embodiment

Figure 3:
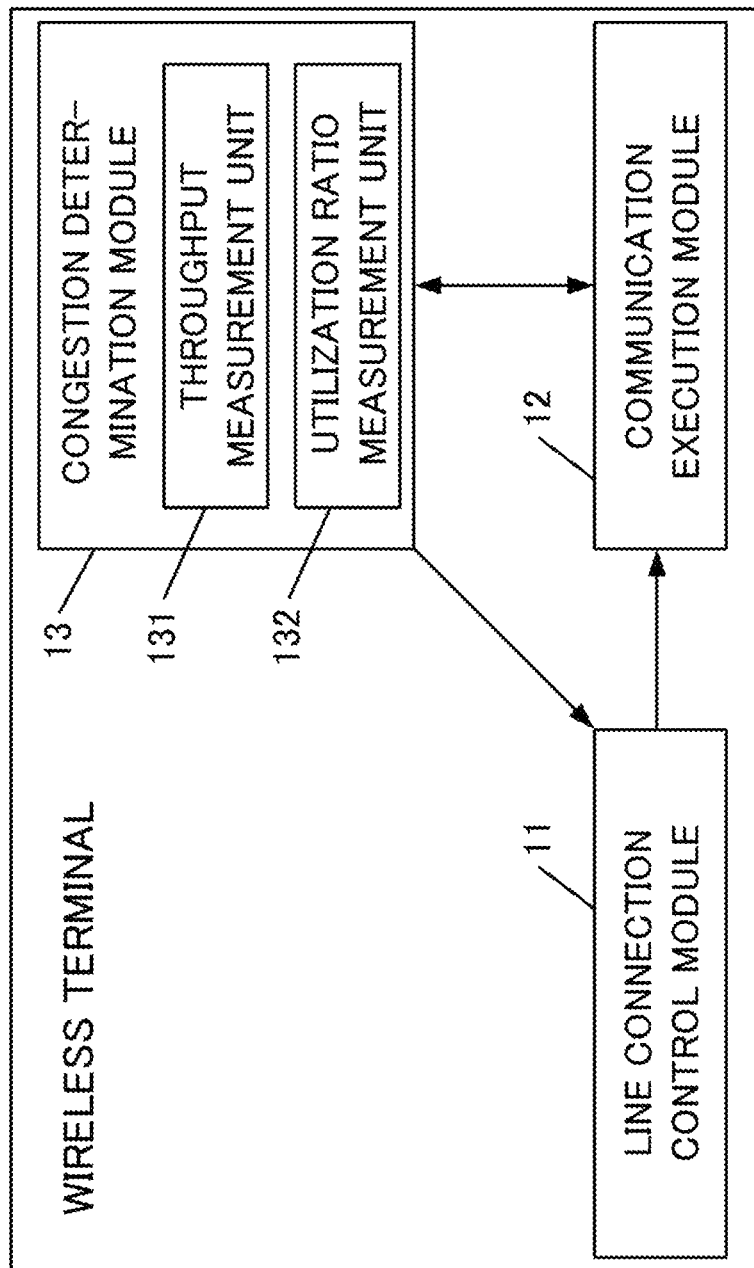
FIG. 3 is a functional block diagram showing a configuration of a main part of a wireless terminal according to a second embodiment.

In the first embodiment, the congestion determination module 13 includes the throughput measurement unit 131, and a degree of congestion of wireless resources is determined based on throughput during data transfer or data observation. However, there may be cases where it is difficult to estimate throughput of other terminals based on a utilization state of radio waves. In consideration thereof, in the present embodiment, a degree of congestion of wireless resources is determined based on a ratio of the number of utilized channels to the total number of channels (hereinafter, also referred to as a channel utilization ratio) in place of the throughput of other terminals. To this end, in the present embodiment, as shown in FIG. 3, the congestion determination module 13 further includes a utilization ratio measurement unit 132. FIG. 3 is a functional block diagram showing a configuration of a main part of the wireless terminal 1 according to the present embodiment. The congestion determination module 13 determines a degree of congestion of wireless resources based on a utilization ratio of channels measured by the utilization ratio measurement unit 132.

Figure 4:
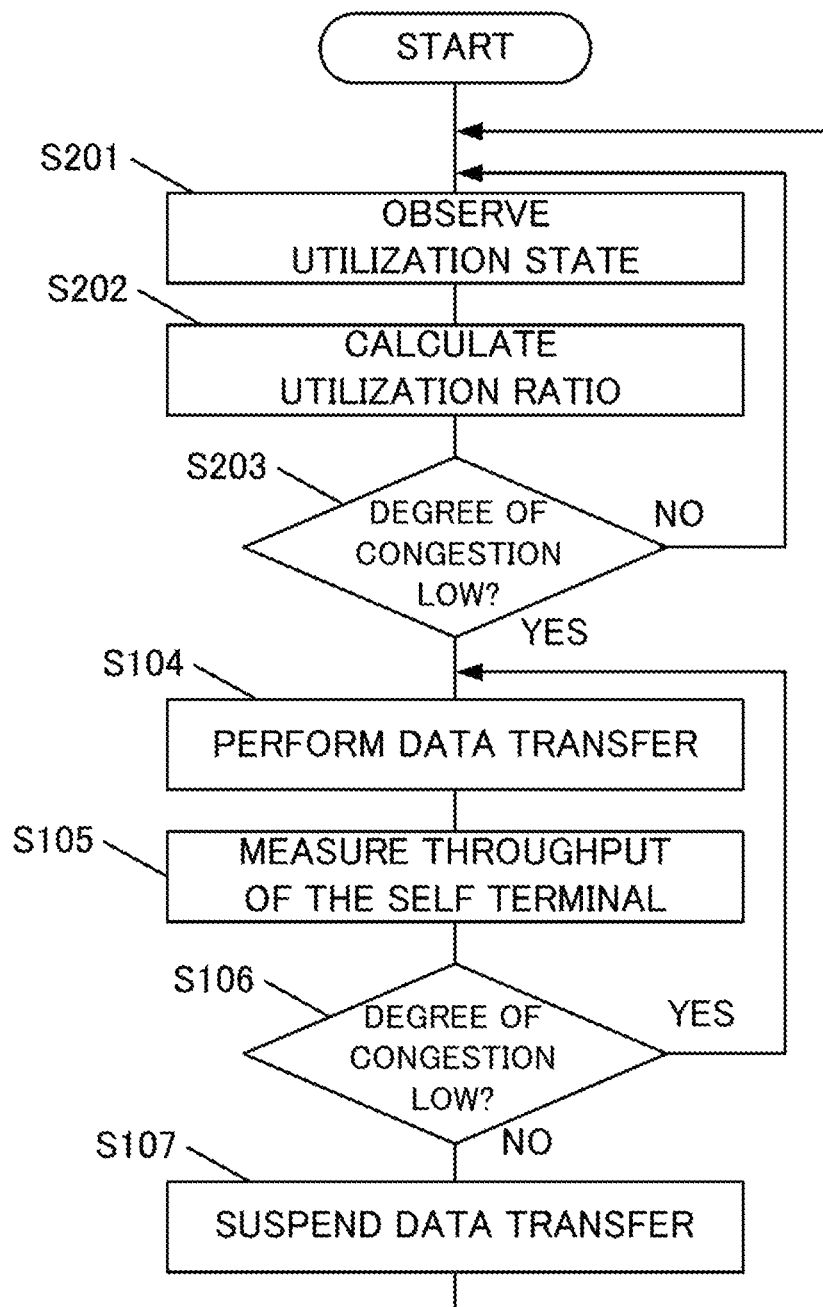
FIG. 4 is a flow chart showing operations of the second embodiment.

FIG. 4 is a flow chart showing operations of the present embodiment. Steps in which a same process as the flow chart shown in FIG. 2 is performed will be assigned same reference characters and a description thereof will be omitted. In step S201, the communication execution module 12 observes the number of channels being utilized. Subsequently, in step S202, the utilization ratio measurement unit 132 calculates a utilization ratio of channels. In addition, in step S203, the congestion determination module 13 compares the utilization ratio of channels calculated in step S202 with a utilization ratio threshold. The utilization ratio threshold is an upper limit value of utilization ratios of channels based on which evaluation of a low congestion state of wireless resources may be made. Moreover, the utilization ratio threshold may be varied in accordance with a priority in a similar manner to the first embodiment. For example, the utilization ratio threshold may be set such that the higher a priority of performing data communication at a wireless terminal, the higher the utilization ratio threshold so that interstitial communication is more readily performed. A relationship between a priority and the utilization ratio threshold may be obtained in advance.

In step S203, when the utilization ratio of channels is lower than the utilization ratio threshold, a determination that the degree of congestion of wireless resources is high is made (in other words, a determination that wireless resources are congested is made), and the flow returns to step S201. As a result, data transfer is not performed.

In contrast, when a determination is made in step S203 that the utilization ratio of channels is equal to or lower than the utilization ratio threshold, since the degree of congestion of wireless resources is determined to be low, the flow advances to step S104 and the line connection control module 11 requests the communication execution module 12 to perform data transfer. The communication execution module 12 performs data transfer in response to the data transfer request. In other words, interstitial communication is performed.

As described above, according to the present embodiment, an off-time of data communication can be sensed from a utilization ratio of channels and data communication can be started accordingly (intercept mode). In addition, after data communication is started, a congested time can be sensed from a communication performance result of wireless communication at the self terminal and data communication can be suspended accordingly (transmission mode). Therefore, since interstitial communication is suspended other than during an off-time in which throughput is high, situations can be suppressed where limited wireless resources are wastefully occupied by wireless connections with low efficiency.

What is claimed is:

1. A wireless terminal, comprising:
an intercept mode evaluation unit configured to evaluate a congestion state of wireless resources, based on a communication state of one or more other terminals intercepted during execution of an intercept mode, which is a mode of intercepting communication by the one or more other terminals without transmitting data from the wireless terminal; and
a transmission mode execution unit configured to execute a transmission mode, in which the wireless terminal performs transmission of data originating from the wireless terminal and reception of data, without executing the intercept mode when the intercept mode evaluation unit evaluates that an off-time has set in, wherein
the intercept mode evaluation unit is configured to evaluate that the off-time has set in when a ratio of a number of utilized channels to a total number of the channels is equal to or lower than a utilization ratio threshold, and the utilization ratio threshold is set such that the utilization ratio threshold increases as a priority of data communication of the wireless terminal increases.

2. The wireless terminal according to claim 1, further comprising:
an intercept mode execution unit configured to execute the intercept mode while suspending the execution of the transmission mode when evaluation is made that a congested time of the wireless resources has set in based on a communication state while the transmission mode is being executed.

3. The wireless terminal according to claim 2, further comprising:
a transmission mode evaluation unit configured to evaluate the congestion state of the wireless resources, based on a communication state of the wireless terminal while the transmission mode is being executed.

4. The wireless terminal according to claim 1, wherein
the intercept mode evaluation unit is configured to evaluate that the off-time has set in when throughput of data communication is equal to or larger than a threshold, and the threshold is set such that the threshold decreases as a priority of the data communication of the wireless terminal increases.

5. A communication control method executed by a wireless terminal, the method comprising:
evaluating a congestion state of wireless resources, based on a communication state of one or more other terminals intercepted during execution of an intercept mode, which is a mode of intercepting communication by the one or more other terminals without transmitting data from the wireless terminal; and
executing a transmission mode, in which the wireless terminal performs transmission of data originating from the wireless terminal and reception of data, without executing the intercept mode when evaluation is made that an off-time has set in, wherein
when the congestion state of the wireless resources is evaluated, evaluation is made that the off-time has set in when a ratio of a number of utilized channels to a total number of the channels is equal to or lower than a utilization ratio threshold, and the utilization ratio threshold is set such that the utilization ratio threshold increases as a priority of data communication of the wireless terminal increases.

6. The communication control method according to claim 5, further comprising:
executing the intercept mode while suspending the execution of the transmission mode when evaluation is made that a congested time of the wireless resources has set in, based on a communication state while the transmission mode is being executed.

7. The communication control method according to claim 6, wherein
the congestion state of the wireless resources is evaluated based on a communication state of the wireless terminal while the transmission mode is being executed.

8. The communication control method according to claim 5, wherein
when the congestion state of the wireless resources is evaluated, evaluation is made that the off-time has set in when throughput of data communication is equal to or larger than a threshold, and the threshold is set such that the threshold decreases as a priority of the data communication of the wireless terminal increases.

* * * * *